United States Patent [19]

Bouyoucos

[11] 4,077,304

[45] Mar. 7, 1978

[54] IMPACT TOOLS

[75] Inventor: John V. Bouyoucos, Rochester, N.Y.

[73] Assignee: Hydroacoustics Inc., Rochester, N.Y.

[21] Appl. No.: 666,733

[22] Filed: Mar. 15, 1976

[51] Int. Cl.² .............. F01B 7/18; F01L 25/04; F01L 17/00
[52] U.S. Cl. .............. 91/276; 91/289; 91/303; 91/321; 91/328
[58] Field of Search .............. 91/289, 286, 303, 328, 91/321, 276

[56] References Cited

U.S. PATENT DOCUMENTS

| | | | |
|---|---|---|---|
| 3,007,452 | 11/1961 | Lee | 91/321 |
| 3,411,592 | 11/1968 | Montabert | 91/303 |
| 3,925,985 | 12/1975 | Peterson | 91/321 |
| 4,022,108 | 5/1977 | Juvonen | 91/276 |

FOREIGN PATENT DOCUMENTS 1,334,837  10/1973  United Kingdom .............. 91/276

Primary Examiner—Paul E. Maslousky
Attorney, Agent, or Firm—Martin Lu Kacher

[57] ABSTRACT

Impact tools are described which are capable of developing percussive forces for rock drilling, seismic exploration and other repetitive high force applications. Each of the tools contains a hammer and a valve which may be hydraulically actuated so as to constitute a hydroacoustic oscillator. The valve is actuated in one direction by being engaged by the hammer and in the other direction by fluid pressure means. The fluid pressure means may be controlled by varying the fluid pressure magnitude which applies forces to the valve to effect the movement thereof so as to control the frequency of oscillation of the hammer (i.e., impact blow frequency). Control may also be provided over the hammer stroke and the blow energy.

39 Claims, 16 Drawing Figures

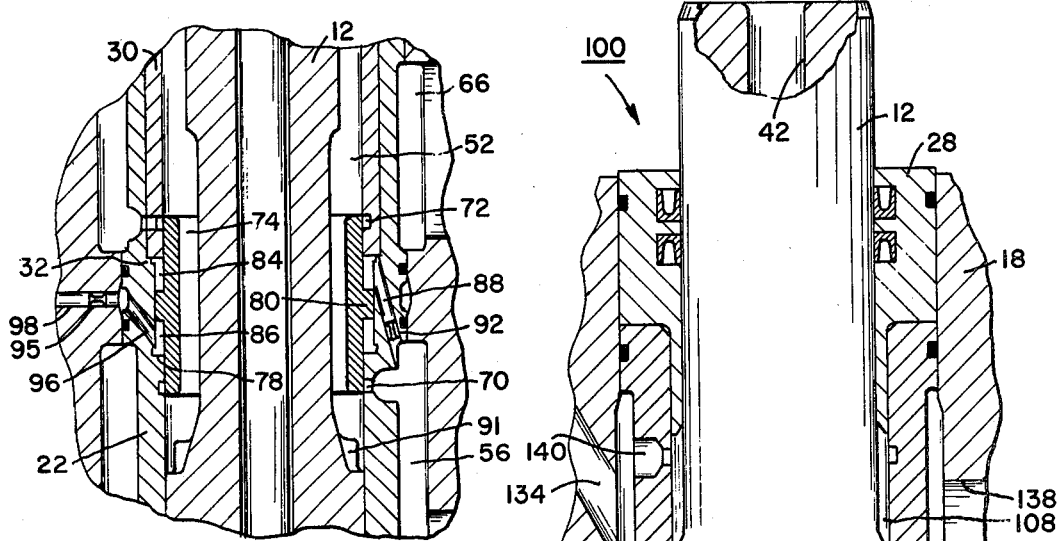
FIG. 2.
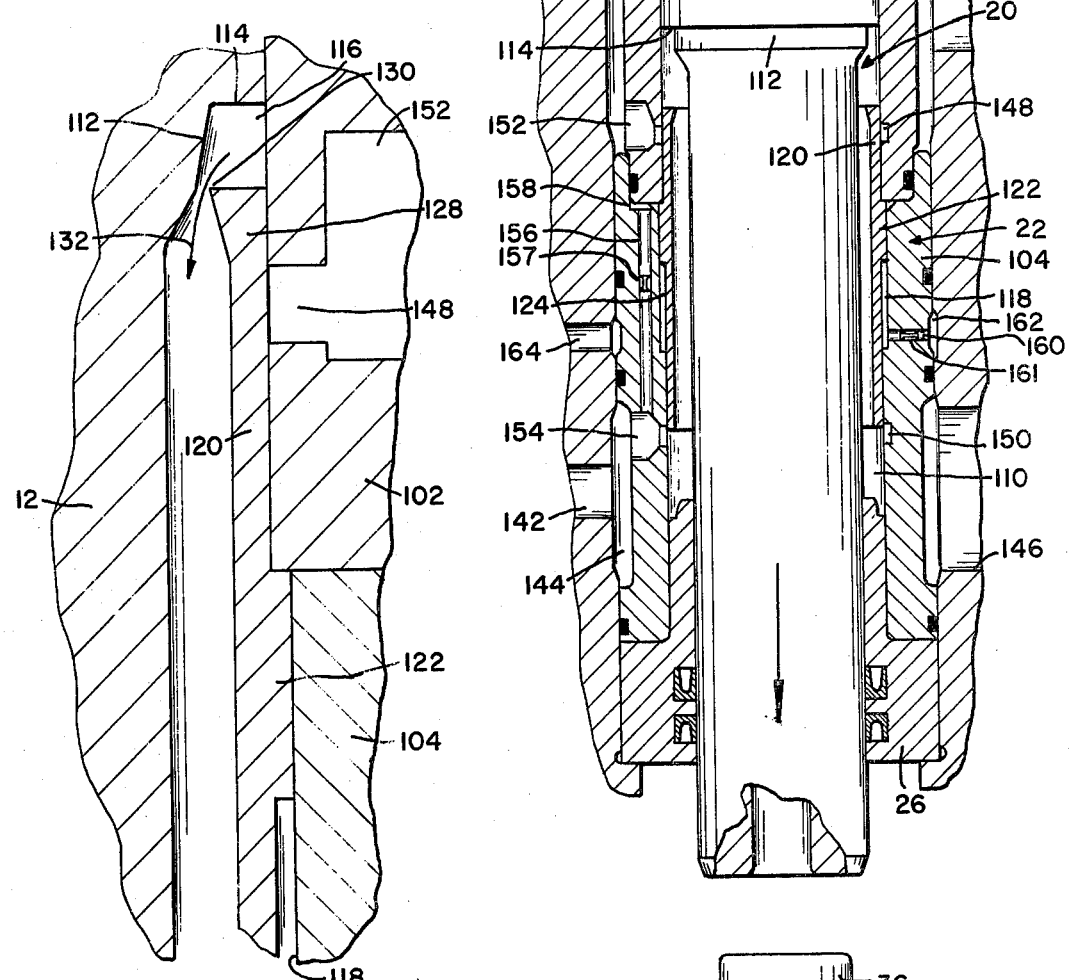
FIG. 6.
FIG. 3.

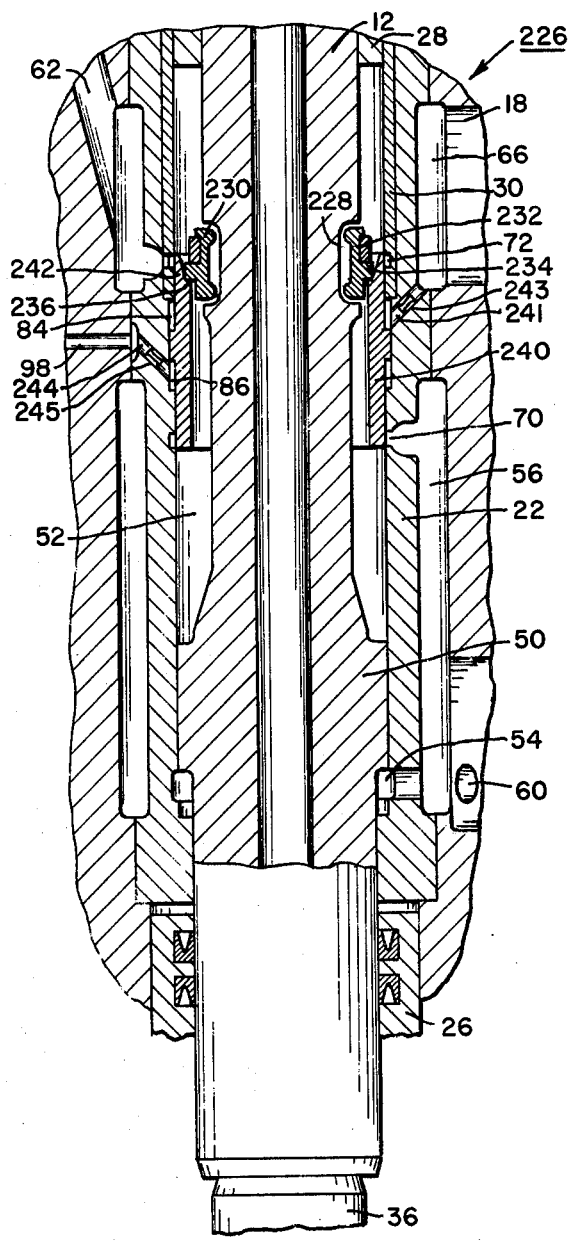
FIG. 9.
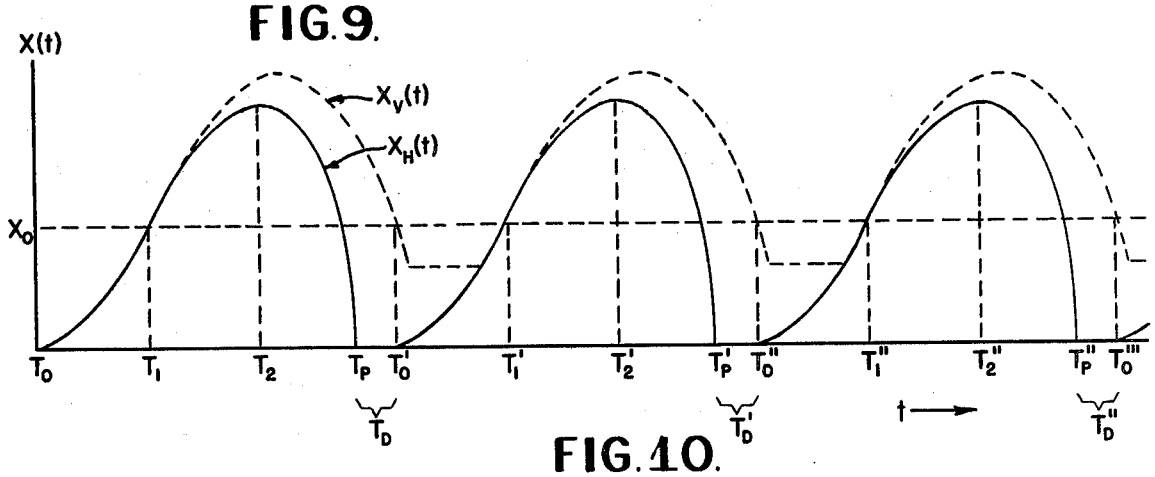
FIG. 15.
FIG. 10.

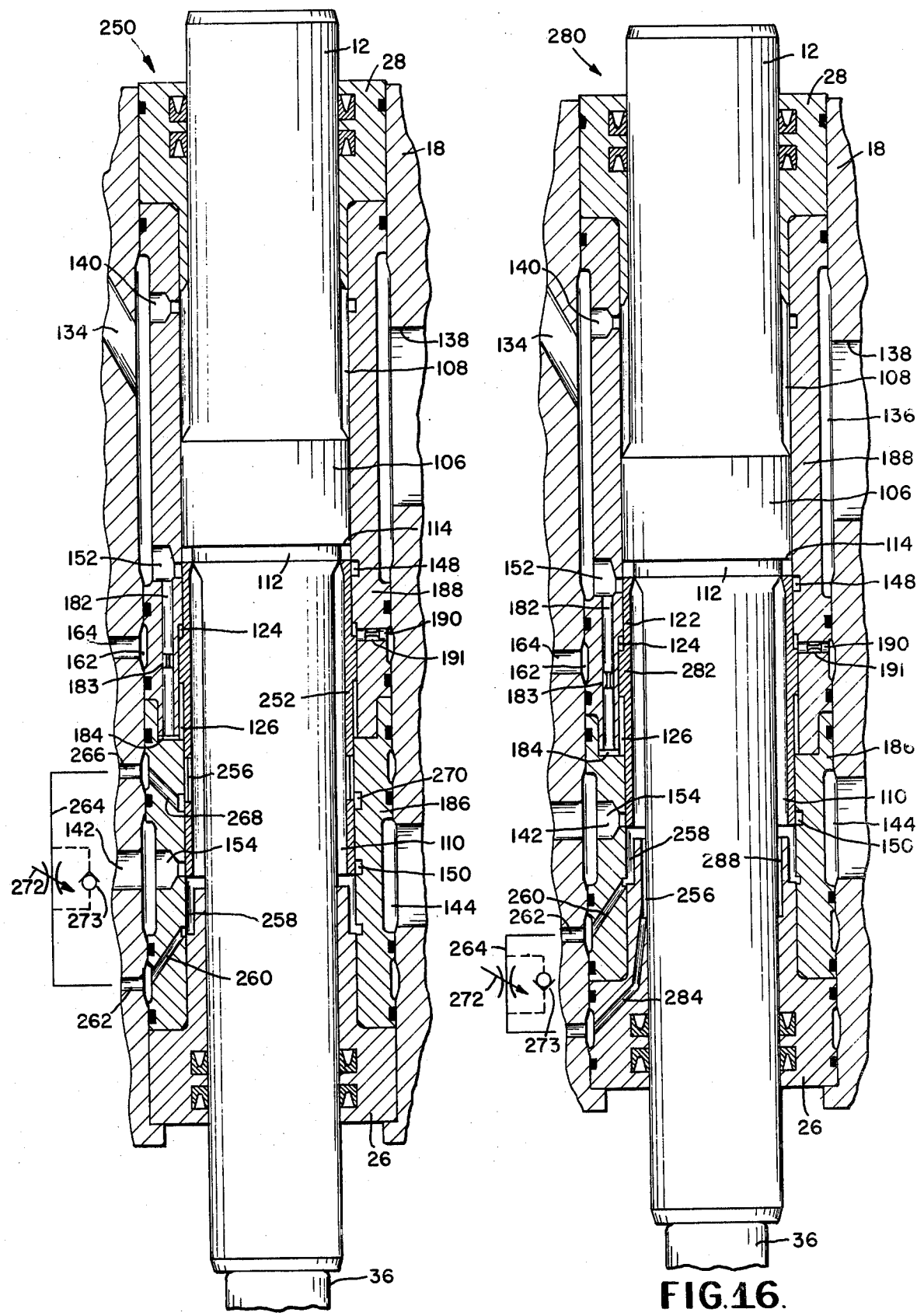

IMPACT TOOLS

The present invention relates to impact tools and particularly to impact tools having an oscillatory hammer and a valve which controls the application of presurized fluid to the hammer to maintain the oscillation thereof.

The invention is especially suitable for use in impact tools such as rock drills, pile drivers and demolition tools as well as for use as a seismic sound source in geophysical exploration. The invention is also applicable for use in hydroacoustic apparatus of the type disclosed in U.S. Pat. Nos. 3,896,889; 3,903,972 and 3,911,789, and is related to the invention disclosed in U.S. patent application Ser. No. 522,977, filed Nov. 11, 1974, in the name of John V. Bouyoucos, et al. now U.S. Pat. No. 4,005,637.

In the tools described in the above-mentioned patents and related application, a hammer actuates a valve element which controls the application of pressurized fluid through a cavity. A hammer is disposed for oscillatory movement in the cavity and is adapted to deliver impact blows to a load during each cycle of oscillation thereof. It is desirable, particularly in the art of rock drilling through the use of percussive energy in the form of impact blows from the hammer, that the blow frequency be variable such that selected blow frequencies at which different formations can be most effectively penetrated may be produced. Another parameter which has been found significant, especially in the art of rock drilling through the use of percussive energy, is the blow energy. It is particularly desirable to utilize the most effective combination of blow frequency and blow energy for a particular rock formation to be drilled. Some formations are more readily penetrated by larger blow energies delivered at a slower repetition rate (viz., at lower blow frequency) while other formations are more responsive when lower blow energies are delivered at a higher rate (viz., at higher blow frequency).

Impact tools are of course capable of delivering only a maximum output power as determined by the capacity of its driving source (viz., the horse power of the diesel engine which drives the pump of the hydraulic power supply) and the efficiency of the impact tool in converting the drive power into impact energy. The total impact energy deliverable to the rock formation or other load is the product of the blow energy and blow frequency. The most effective utilization of the available input power is obtainable only when the combination of blow frequency and blow energy most effective in doing useful work (viz., penetrating the rock formation) consonant with the power capability of the tool is utilized. Thus, control of both blow energy and blow frequency is especially desirable in impact tools.

The tools described in the above referenced patents are designed to operate at selected frequencies which can be varied by changing the sizes and porting relationships of the valve and hammer. It is desirable to provide for control over blow frequency and also over combinations of blow frequency and blow energy in a more convenient and accessible manner.

Accordingly, it is an object of the present invention to provide improved impact tools which are capable of delivering percussive energy to loads.

It is a further object of the present invention to provide improved hydroacoustic apparatus.

It is a further object of the present invention to provide improved impact tools having oscillatory hammers which deliver repetitive impact blows to a load wherein blow frequency may be varied.

It is a still further object of the present invention to provide improved impact tools having oscillatory hammers which deliver repetitive blows to a load in which both blow frequency and blow energy may be varied.

It is a still further object of the present invention to provide improved impact tools wherein blow frequency and blow energy may both be varied while maintaining their product (viz., the output power level from the tool) constant.

It is a still further object of the present invention to provide improved impact tools having oscillatory hammers wherein the displacement or length of the stroke executed by the hammer may be varied.

It is a still further object of the present invention to provide an improved valved oscillator for use in an impact tool or the like having a hybrid valve actuation cycle in which the valve is actuated mechanically for movement in one direction and by fluid pressure for movement in the opposite direction.

It is a still further object of the present invention to provide an improved valved impact tool having a hybrid valve actuation cycle which assures that the hammer will separate from the anvil shank or other load immediately after impact therewith.

It is a still further object of the present invention to provide an improved valved impact tool having a hybrid valve actuation cycle which enables the valve to be actuated by the hammer and accelerated from a rest position very rapidly but without damaging the valve or the hammer.

Briefly described, an impact tool embodying the invention includes a hammer and a valve wherein the valve is actuated by hammer engagement during a hammer stroke in one direction and is fluid pressure actuated so as to return the valve in the opposite direction; the valve thus having a hybrid valve actuation cycle. The valve is adapted alternately to open and close fluid supply and return ports so as to develop forces which effect oscillation of the hammer in opposite directions. Fluid pressure control means are provided for the valve to vary the period of time for the execution of the return stroke of the valve after it is actuated by engagement with the hammer. The periodicity of the hammer oscillations (viz., the blow frequency) and/or the length of the hammer stroke is a function of this predetermined time period. Accordingly, the blow frequency and the blow energy is controllable by means of the control of the fluid pressure actuation of the valve.

The foregoing and other objects and advantages of the invention as well as the mode of operation and the presently preferred embodiments thereof will be more apparent from a reading of the following specification in connection with the accompanying drawings in which:

FIG. 2 is an enlarged fragmentary sectional view of a tool similar to the tool shown in FIG. 1 which illustrates a valve control arrangement in accordance with another embodiment of the invention;

FIG. 3 is a fragmentary sectional view of an impact tool similar to the tool shown in FIG. 1 in accordance with another embodiment of the invention;

FIG. 6 is an enlarged fragmentary sectional view illustrating portions of the valve and hammer of the tool shown in FIGS. 3 to 5 as the hammer moves into engagement with the valve;

FIG. 9 is a fragmentary view of an impact tool similar to the tool shown in FIG. 1 but in accordance with a still further embodiment of the invention;

FIG. 10 is a curve depicting the time displacement history of the valve element and of the hammer in the tools illustrated in FIGS. 1 and 2;

FIG. 14 is a fragmentary sectional view similar to FIGS. 3 to 5 and illustrating an impact tool in accordance with a still further embodiment of the invention;

FIG. 15 is a fragmentary view illustrating a portion of the valve which may be used in the tool shown in FIG. 14; and FIG. 16 is a fragmentary sectional view similar to FIG. 14 and illustrating an impact tool in accordance with a still further embodiment of the invention.

Figure 1:
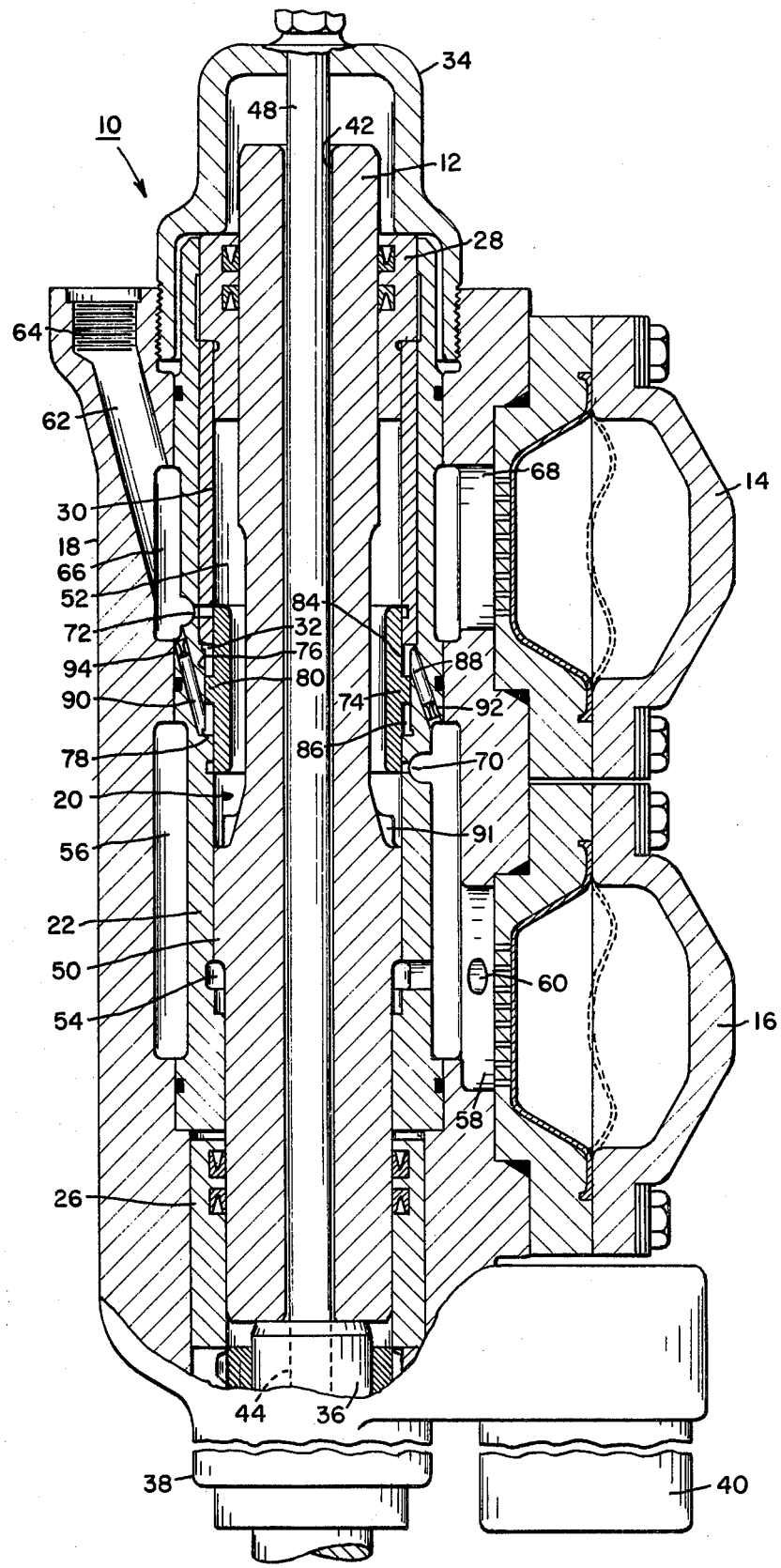
FIG. 1 is a fragmentary sectional view of an impact tool embodying the invention.

Referring to FIG. 1 there is shown a hydraulic fluid operated impact tool 10. Such tools are also known as percussive tools or percussive drills. The tool contains a hydroacoustic oscillator which includes a massive hammer 12, a valve element 74, accumulators 14 and 16 and various fluid filled galleries and cavities in a housing 18 to which the accumulators 14 and 16 are attached by suitable bolts. The hammer 12 oscillates in a central opening or chamber 20 in the housing 18. This opening 20 extends axially of the housing and is in the form of a bore in a cylindrical sleeve or liner 22. The opposite ends of the hammer 12 are slidably disposed in bearing members 26 and 28 which are located at opposite ends of the liner 22. The liner 22 has an upper part 30 the lower end of which is seated on a step 32 (see also FIG. 2). An end cap 34 is threadedly engaged at the upper end of the housing 18 and retains the bearing member 24 and the liner parts 22 and 30 within the housing 18.

The hammer 12 impacts upon a shank 36. The shank is part of an anvil system which transmits the force pulses created by the impact of the lower end of the hammer upon the shank to a load which may be a drill steel with a rock bit engaged with a rock formation. A chuck assembly 38 holds the shank for rotation by means of a hydraulic motor 40. Reference may be had to U.S. Pat. No. 3,640,351, issued Feb. 8, 1972, for further information respecting the design of the shank 36 and chuck assembly 38. The above referenced patent also discusses the use of passages such as the bore 42 in the hammer 12 and the bore 44 in the shank 36 in which a tube 48 is located for the passage of cleansing fluid, suitably air or water, for flushing and cleaning the holes drilled by the tool.

The hammer 12 oscillates in opposite directions along the axis of the opening 20. One of these directions is towards an impact position where the lower end of the hammer impacts the shank 36. The hammer is shown in this impact position in FIG. 1. The other direction is the return stroke of the hammer. The hammer has a central section 50 of diameter slightly less than the diameter of the liner bore which divides the chamber 20 into an upper cavity 52 and a lower cavity 54. The opposite sides of the section 50 present drive areas in planes normal to the axis of hammer motion. The drive area presented to the upper cavity 52 is larger than the drive area presented to the lower cavity 54; the drive area presented to the upper cavity suitably being twice as large as that presented to the lower cavity. The lower cavity 54 receives supply pressure from a cylindrical gallery 56. This gallery 56 is connected by way of a lateral passage 58 to the supply accumulator 16. A channel 60 in the housing to which pressurized hydraulic fluid is supplied to the tool 10 by way of hoses (not shown) communicates with the passage 58. This supply pressure in the lower cavity 54 continuously urges the hammer in the return stroke direction.

A channel 62 in the housing has a coupling 64 which may be connected to the return side of a hydraulic pump. The supply pressure channel 60 and its associated couplings may be similar to the return channel 62 and coupling 64. A gallery 66 is in communication with the return channel 62. The return accumulator 14 is connected to the gallery 66 by way of a lateral passage 68. A supply port 70 and a return port 72 are provided by peripheral grooves which extend circumferentially around the inner wall of the liner parts 22 and 30 and communicate supply pressure from the supply gallery 56 and return pressure from the return gallery 66 to the upper cavity 52. The galleries 56 and 66 may be connected to the supply and return ports 70 and 72 by way of lateral openings in the liner parts 22 and 30. A valve element 74 is disposed in porting relationship with the supply and return ports and is movable in the directions of the forward and return stroke of the hammer to switch fluid pressure in the upper cavity alternately from supply to return pressure in order to maintain the oscillation of the hammer. The valve element 74 is a cylindrical sleeve or tube having an outer diameter slightly less than the inner diameter of the liner bore. The length of the valve element 74 is equal to the distance between the upper and lower edges of the supply and return ports 70 and 72 such that the ports will be alternately opened and closed as the hammer slides within the bore. Suitable seals and "O" rings are used to keep the pressurized fluid confined in the housing 18.

A cylindrical recess 76 is formed in the liner 22 between the lower end of the upper liner part 30 and a shoulder 78 in the liner part 22. The outer periphery of the valve element 74 closes this recess 76 to form a valve cavity. The valve element 74 also has a radially outward projecting step 80 which divides the cavity into upper and lower valve cavity parts 84 and 86. The opposite sides of the step 80 present drive areas in a plane perpendicular to the axis of the valve element. A channel 88 communicates the supply pressure gallery 56 with the upper cavity 84. Another channel 90 communicates the return gallery 66 with the lower cavity 86. The pressurized fluid in the cavities 84 and 86 develop forces on the drive area which continuoously urge the valve element 74 downwardly in the forward stroke direction.

The lower end of the valve element 74 is in interfering relationship with an axially slotted lip 91 extending upwardly from the upper side of the central section 50 of the hammer 12. The hammer is engageable with the valve element at the lip when the hammer moves in the return stroke direction and moves the valve element upwardly so as to open the supply port 70 and close the return port. Supply pressure is then applied to the upper cavity which, since the drive area on the upper side of the hammer central section 50 is larger than the area of the lower side thereof, develops a net force on the hammer in the downward direction. The hammer then coasts upwardly until it reaches zero velocity and then is driven downwardly to impact position completing the forward stroke thereof.

The valve element is driven upwardly upon engagement with the hammer and executes a different trajectory from the hammer since its motion and displacement is influenced by the fluid pressure developed forces which are applied to the drive area of the step 80 thereof. These fluid pressures may be adjusted by means of restrictions 92 and 94 in the channels 88 and 90 which form orifices or fluid resistors therein. It is preferable, however, to utilize a source of control pressure $P_C$ which is communicated to the lower cavity 86 by means of channels 96 and 98 in the liner and housing, as shown in FIG. 2. In FIG. 2 a further restrictor 95 may be inserted in the control line 98 to provide dynamic damping control of the valve motion and to achieve stable tool operation. The channel 98 may be connected to a coupling and hose for supplying fluid at the control pressure. The control pressure may be continuously varied by means of a regulator valve as will be discussed hereinafter in connection with FIGS. 12 and 13. The pressurized fluid forces developed on the valve element 74 effect motion thereof in the downward direction. Thus, after the valve is driven upwardly by the hammer 12, the valve is driven downwardly in response to the pressurized fluid forces to return to the switching position shown in FIG. 1. The valve returns to the switching position only after the hammer has returned to impact on the shank. The period for the valve motion cycle is a function of the force developed hydraulically by the pressurized fluid acting on the valve element.

Consider that the simplified equation of motion of the valve in terms of its force and displacement is expressed by the equation:

$$X = \tfrac{1}{2} (F/M) t^2 + v_o t + Xo \qquad (1)$$

where, $X$ is the distance travelled by the valve element from the switching position $Xo$, $v_o$ is the velocity imparted to the valve by the hammer; $M$ is the mass of the valve element; $F$ is the hydraulically developed force on the valve element; and $t$ is the period of time after the valve disengages from the hammer. Equation (1) may be solved to obtain approximately the time, $T_R$, for the valve to return to the switching position, $Xo$, $$T_R = 2 V_o M / F \qquad (2)$$

Also, the stroke $X_M$, of the valve away from the switching position $Xo$ is approximately $$X_M - Xo = \tfrac{1}{2} (v_o^2 M/F) \qquad (3)$$

Thus, by varying the hydraulic force, F, on the valve, the period of time, $T_R$, for the valve element to return to the switching position, $Xo$, may be varied. Only after the valve returns to the switching position $Xo$ will the forces on the hammer reverse, causing the hammer to accelerate away from its impact position. Since the period of time, $T_R$, required for the valve to execute its displacement cycle is a function of the hydraulic pressure applied to the valve element 74, the frequency of oscillation and therefore the blow frequency of the impact tool can be varied by varying the hydraulic pressure applied to actuate the valve 74.

The cycle of oscillation of the impact tool shown in FIG. 1 and FIG. 2 is illustrated by the curves of FIG. 10; where the solid line curve labeled $X_H(t)$ represents the displacement of the hammer with respect to time; and the dash line curve $X_V(t)$ represents the displacement of the valve 74 also with respect to time. Consider that the hammer is at the impact position at time $T_0$ and the valve 74 has moved downwardly past the position shown in FIG. 1 and FIG. 2, such that the return port 72 is opened while the supply port 70 is blocked by the valve element 74. The hammer is then moved upwardly until the hammer lip 91 engages the lower end of the valve element 74 and raises the valve element 74 to the switching position shown in FIG. 1. This occurs at time $T_1$. The pressure in the upper cavity 52 is then switched from return to supply pressure and forces are developed on the hammer tending to drive it downwardly in the return direction. The hammer coasts upwardly until it reaches zero velocity at time $T_2$.

Inasmuch as the hammer begins to decelerate in its upward trajectory once it has moved the valve past its switching position, the valve tends to separate from the hammer and executes a different trajectory as shown by the dashed lines. The hammer continues to be driven downwardly at increasing velocity between the time $T_2$ and $T_P$. At $T_P$ the lower end of the hammer reaches the impact position and an impact blow is delivered to the shank 36. The valve element 74 however has not yet reached the switching position which is represented by the horizontal dash line at distance $X_0$. The valve element is at $X_0$ in the position thereof shown in FIGS. 1 and 2. The valve element 74 does not reach the switching position $X_0$ until a delay time $T_D$ after the hammer reaches the impact position at time $T_P$. the hammer thus remains or dwells at the impact position during the time period $T_D$. The total time after the hammer engagement with the valve for the hammer to return to the switching position (viz., from $T_1$ to $T_0'$) is a function of the forces hydraulically developed on the valve element 74. The period of time $T_D$ and thus the frequency of oscillation or blow frequency of the impact tool is controlled as a function of the amplitude of the hydraulic pressure applied to the valve element.

After the valve element reaches the switching position at time $T_0'$, and the return port is open while the supply port is blocked, the valve element continues moving downwardly to a limit determined by the position of the shoulder 78. This position is shown by the horizontal dash line which is lower that the switching position at $X_0$. The hammer begins the return stroke at $T_0'$ and when it reaches the rest position of the valve (viz., the intersection of the lower dash line with the solid line) the valve element 74 is engaged, and a second cycle of oscillation of the hammer and valve commences. The hammer stroke is the same during each cycle. The blow frequency may however be varied. Accordingly, the impact tools shown in FIGS. 1 and 2 provide the same energy during each blow (viz., the area within the solid line curve) but with a blow frequency which may be varied. This characteristic is especially suitable for seismic exploration purposes since it enables the blow frequencies to be continuously varied with constant energy such that the seismic energy can be swept in frequency over a range of frequencies important for geophysical exploration purposes.

Figure 4:
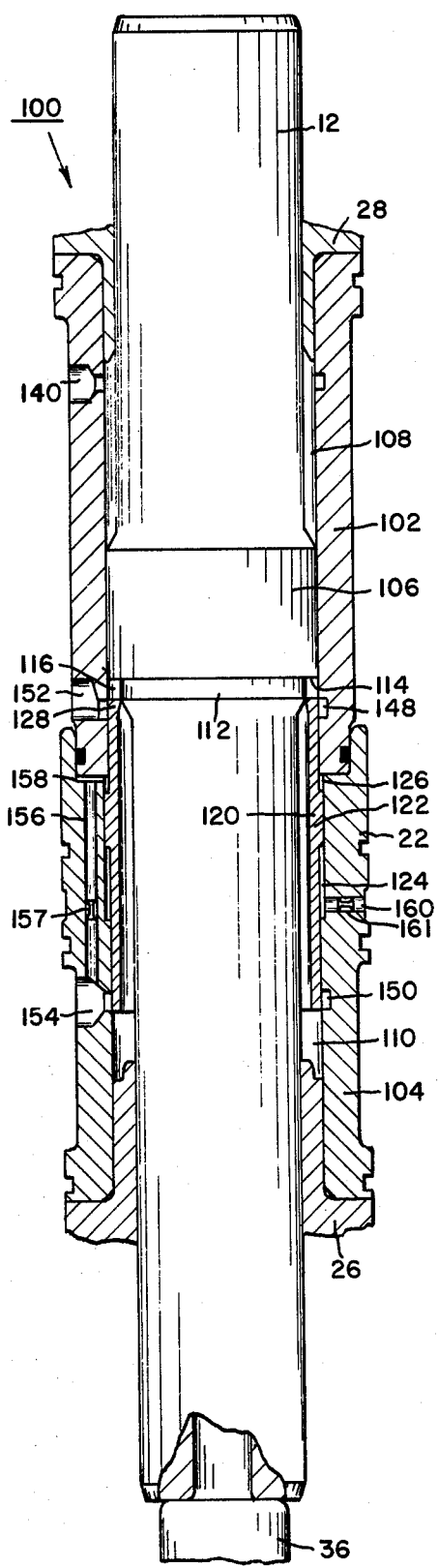
FIGS. 4 and 5 are views similar to FIG. 3 which illustrate the tool shown in FIG. 3 but in different positions during its cycle of operation.
Figure 5:
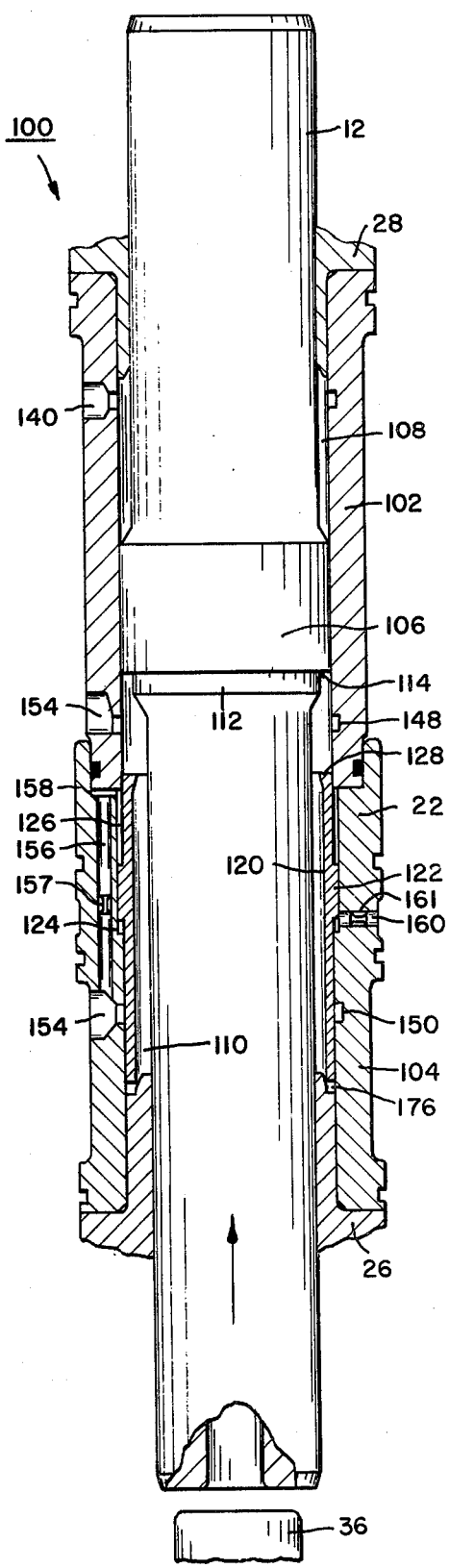

Referring to FIGS. 3 to 5, there is shown an impact tool 100 in accordance with another embodiment of the invention. Like the tool 10 shown in FIG. 1, the tool 100 has a housing 18 and a hammer 12 which oscillates in opposite directions along a forward stroke to an impact position where it contacts a shank 36. The hammer is shown disposed at the impact position in FIG. 4. FIG. 3 illustrates the position of the hammer near the upper end of the return stroke when it has commenced movement in the forward stroke direction. FIG. 5 illustrates the hammer 12 while it is travelling in the return stroke direction. Arrows on the hammer indicate the direction of travel thereof in each of the positions shown in FIGS. 3, 4 and 5. The housing 18 has an opening 20 extending axially thereof in which the hammer is mounted for oscillatory movement. This opening 20 is defined by a bore in a liner 22 having upper and lower parts 102 and 104. The bearing members 26 and 28 at the opposite ends of the liner 22 are assembled together with the liner parts 102 and 104 in the housing 18. Suitable seals and "0" rings are provided to maintain the pressurized hydraulic fluid in the opening 20 and in the various other openings, conduits and galleries in the housing 18.

The hammer 12 has a section 106 similar to the section 50 of the hammer shown in FIG. 1. The diameter of this section 106 is only slightly less than the diameter of the bore in the liner 22 and divides the bore into upper and lower fluid cavities 108 and 110. The portion of the hammer 12 in the upper cavity 108 is of larger diameter than the portion of the hammer in the lower cavity 110. The area presented to the upper cavity 108 in a plane perpendicular to the axis of the hammer 12 is therefore smaller than the area presented in a plane perpendicular to the axial direction of hammer movement to the lower cavity 110. These areas constitute drive areas wherein forces are developed on the hammer in response to pressurized fluid in the cavities 108 and 110. These areas may be sized so that the area presented to the upper cavity 108 is one-half that presented to the lower cavity 110. These areas are formed by sloping surfaces between the central section 106 and the upper and lower portions of the hammer which are of larger and smaller diameters respectively.

A step portion 112 extends downwardly from the side of the central section 106 which faces the lower cavity 110. A shoulder 114 is formed on this lower side of the central section 106 adjacent to the step portion 112. This step portion 112 is tapered outwardly away from the wall of the bore in the liner 102 (see FIG. 6). A pocket 116 is formed between the bore wall, and the shoulder 114 and step portion 112 of the hammer 12.

A step portion of the lower liner part 104 forms a peripheral groove or recess 118 in the bore wall. A valve element 120 has a step 122 of a diameter slightly less than the diameter of the recess 118 and projects into the recess so as to divide it into lower and upper cavities 124 and 126. The shoulders formed by the liner parts 102 and 104 at the upper and lower ends of the recess 118 provide stops for the travel of the valve element 120 in the forward and return stroke direction. The valve element 120 itself is a cylindrical sleeve or tubular member of outer diameter slightly smaller than the diameter of the bore wall so that it is slidable in an axial direction along the bore wall. A tapered portion 128 at the upper end of the valve element 120 forms a sharp edge 130 (see FIG. 6). This end 130 and the sloping step portion 112 of the hammer 12 provide a sharp-edged tapered orifice for the flow of fluid entrapped in the pocket 116 when the hammer 112 moves into engagement with the valve element 120. The direction of the flow of fluid from the pocket 116 is shown by the arrow 132 in FIG. 6. The variation in flow due to the decreasing size of the orifice as the hammer moves into engagement with the valve element 120 provides a damping effect so as to enable the valve element to be picked up and accelerated from rest (from the stop position with the step portion against the stop provided by the upper end of the recess 118) just before the hammer reaches impact position and delivers an impact blow to the shank 36 (see FIG. 4).

Pressurized fluid from a source of supply pressure $P_S$ enters the housing through a channel 134 which is connected to a coupling and via hoses to a hydraulic power supply as was explained in connection with FIG. 1. A supply gallery 136 formed in the housing around the bore receives the supply pressure from the channel 134. The gallery 136 communicates with a supply accumulator (of a design similar to the accumulators 14 and 16 shown in FIG. 1) through a lateral passage 138 in the housing 18. A lateral passage and peripheral groove 140 in the upper liner part 102 communicates the supply gallery 136 with the upper cavity 108. The supply pressure is therefore applied to the upper cavity 108 and develops forces continuously urging the hammer 12 in the forward stroke direction.

A channel 142 for return pressure is connected to a return gallery 144. The return pressure channel 142 may be connected by way of suitable couplings and hoses to the return side of the hydraulic power supply. A lateral passage 146 connects the return gallery 144 to a return accumulator (not shown). The supply gallery 136 and the return gallery 144 are in communication with the lower cavity 110 via supply and return ports 148 and 150. These ports are provided by peripheral grooves in the liner parts 102 and 104 which are in communication with the galleries 136 and 144 by way of a plurality of lateral passages 152 and 154. These passages are spaced circumferentially around the supply and return port grooves. The supply and return ports 148 and 150 are spaced from each other by distance equal to the length of the valve element 120 such that they are alternately opened and closed as the valve element moves in opposite directions along the axis of the bore.

Figure 12:
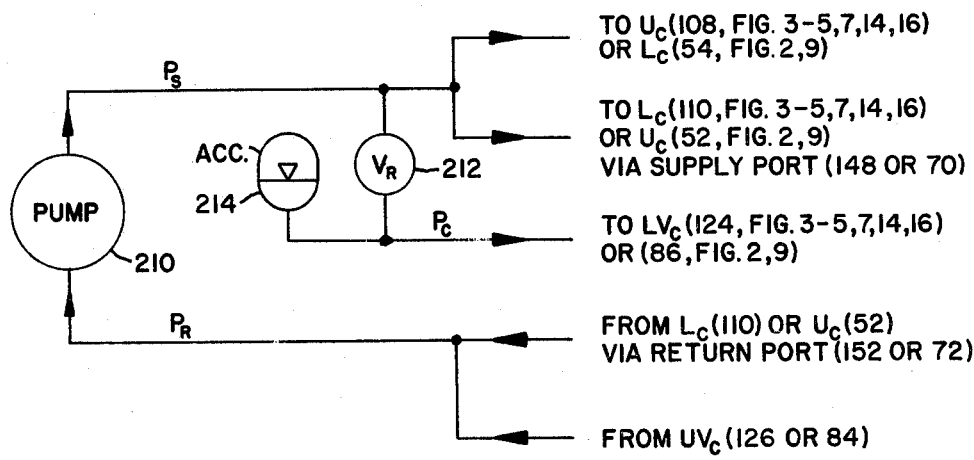
FIG. 12 is a schematic diagram of a hydraulic circuit for pressurized fluid which may be used with the impact tools shown in FIGS. 2, 3 to 5, 7, 9, 14 and 16.
Figure 13:
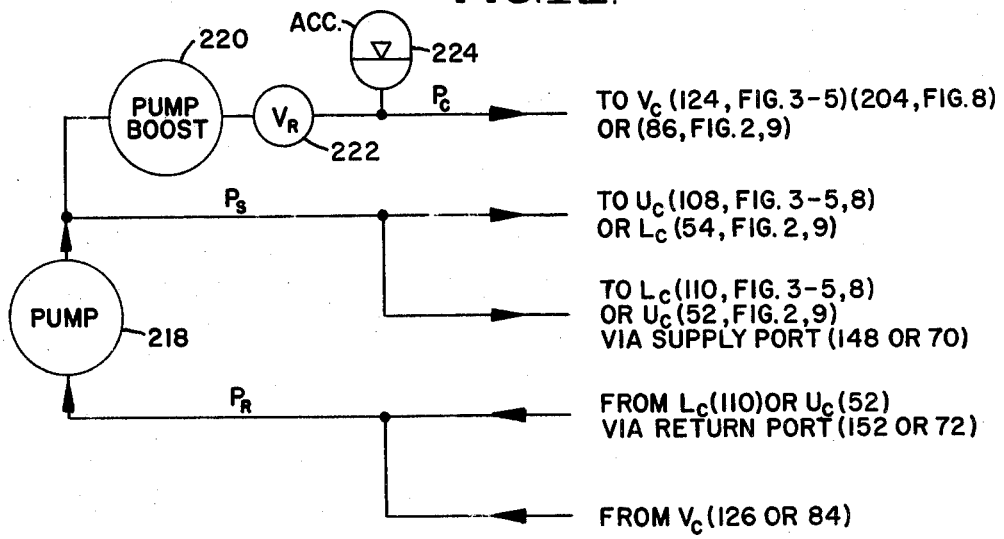
FIG. 13 is a schematic diagram of a hydraulic circuit suitable for use in connection with the impact tool illustrated in FIG. 8.

The valve element is fluid pressure actuated for movement in the return stroke direction by pressurized fluid which is communicated to the upper and lower cavities 126 and 124. A vertically extending channel 156 and a passage 158 formed in the space between the liner parts 102 and 104 connects the passage 154 with the upper cavity 126; thus communicating return (outlet) pressure to the upper cavity 126. The lower cavity 124 is connected by way of a lateral passage 160 to a gallery 162. A channel 164 for control pressure from a source of control pressure such as may be derived from the hydraulic power supply in a manner to be described hereinafter in connection with FIGS. 12 and 13, is connected to the channel 164. Inasmuch as the control pressure is higher than return pressure, the valve element is biased, and continuously urged, in the return stroke direction in response to forces which are hydraulically developed on the areas presented by the opposite sides of the valve element step 122. As in the cases of FIGS. 1 and 2, restrictors 157 and 161 may be placed in the channels 156 and 160, respectively, to provide dynamic damping control on the valve and to assist in achieving stable tool operation.

FIG. 3 shows the hammer 12 moving toward the impact position. The valve 120 is in its maximum upward position where the upper end of the step 122 engages the upper end of the recess 118. FIG. 6 also shows the valve 120 in this position. The lower cavity 110 is at return pressure since the return port 150 is opened by the valve while the supply port 148 is blocked. Supply pressure through the passage 140 into the upper cavity 108 thus develops the forces on the hammer which drive it along the forward stroke to impact.

FIG. 4 shows the hammer after it has engaged the upper end 128 of the valve 120. Such engagement may be through the column of fluid trapped in the pocket 116. The hammer has reached the impact position against the shank 36 and is stopped. The valve 120 continues to move and separates from the hammer. The valve motion is initially at the same velocity as the hammer. Thereafter the velocity is controlled by the forces developed due to the hydraulic pressure in the cavities 124 and 126. The supply port 148 is disposed adjacent to the upper end of the valve element 120 when the valve has been engaged by the hammer. Continued movement in the forward stroke direction results in opening of the supply port. Pressurized fluid then flows into the pocket 116 (viz., at the valve-hammer interface) and assists in driving the valve in the forward stroke direction downwardly away from the hammer. As noted above, the pocket and the orifice arrangement provided by the tapered step portion 112 and the sharp edge 130 provide for damping engagement to enable the valve to be accelerated smoothly from rest at the stop position. The acceleration of the valve is therefore smooth and may be controlled so that the velocity attained by the valve until the supply port 148 opens is limited.

The opening of the supply port 152 and the closing of the return port 150 results in the development of forces on the hammer 106 in the return stroke direction immediately upon impact. The hammer thus separates from the shank 36 leaving a free surface at the upper end of the shank 36. This is in distinction to the tool shown in FIGS. 1 and 2 where the hammer may remain in contact with the shank for the delay (dwell) time $T_D$ as explained in connection with FIG. 10, which delay time may be variable in accordance with the selected blow frequency. In rock drilling applications, it is generally desirable that the hammer not dwell on the shank after impact, but back off the shank leaving a free surface at the end of the shank. The shank is, as explained in the above referenced U.S. Pat. No. 3,640,351, connected to a drill steel which in turn in connected to a bit held by pull-down force or due to the weight of the impact tool against the formation which is being drilled. The impact blow results in a compressional wave which is applied to the end of the shank and then travels downwardly through the drill steel to the bit and then to the earth formation so as to cause penetration thereof. There may be some reflection of the force pulse which is transferred from the bit to the formation back along the drill steel and then to the shank. This reflected wave may be propagated as a tensile wave. When the tensile wave reaches the free surface (viz., the hammer being back off from the shank) it is again reflected as a compressional wave back down to the formation and may assist in drilling. If however, the hammer dwells on the shank such that the end of the shank is not a free surface, the tensile wave is reflected in the same phase, again as a tensile wave. When this reflected tensile wave reaches the bit it tends to lift the bit off the formation, thus reducing the drilling effect and requiring increased pull down forces to maintain the bit in contact with the formation. Accordingly, the embodiment of the invention as provided for in FIGS. 3 to 5 which enables the hammer to separate from the shank immediately after impact, is especially suitable for rock drilling applications.

FIG. 5 shows the hammer accelerating upwardly due to supply pressure in the lower cavity 110. The valve element 120 continues to move downwardly but decelerates due to the bias force developed as a result of the control pressure in the lower valve cavity 124. The valve ultimately returns to the switching position shown in FIG. 4 and then to the stop position shown in FIG. 3. Until the valve causes switching of the pressure in the lower cavity 110 to return pressure, the net force developed on the hammer is in the upward direction and the hammer continues to travel along the return stroke. The period of time for the valve element 120 to return to stop position is a function of the control pressure, since the control pressure determines the force which urges the valve continuously in the return stroke direction. The time control due to the control pressure was explained above in connection with FIG. 1. The relationship between the time between switching of the pressure in the lower cavity 110 from supply to return pressure is also given in equation (1) above. Inasmuch as the hammer accelerates along the return stroke until the valve switches the pressure in the lower cavity back to return, the length of the return stroke of the hammer, and of course the following forward stroke which is equal thereto, is also a function of the control pressure applied to the valve and established in the lower valve cavity 124. The period of the return stroke is proportional to the length thereof and thus the blow frequency of the hammer may be varied and selected by means of varying the control pressure. The blow energy is a function of the velocity attained by the hammer. The longer the hammer stroke, the higher the hammer velocity. Accordingly, the blow energy is also variable and may be controlled by varying the control pressure in the lower valve cavity 124. The higher the control pressure the more rapidly will the valve return to the switching position and the shorter the stroke. Thus, blow frequency is directly proportional to the control pressure while the blow energy is inversely proportional thereto. The control pressure thus enables the selection of different combinations of blow frequency and blow energy consonant with the maximum power produced by the hydraulic power supply which drives the impact tool, thus making efficient use of the available energy consonant with the requirements of the load (e.g., the rock formation being drilled).

Figure 11:
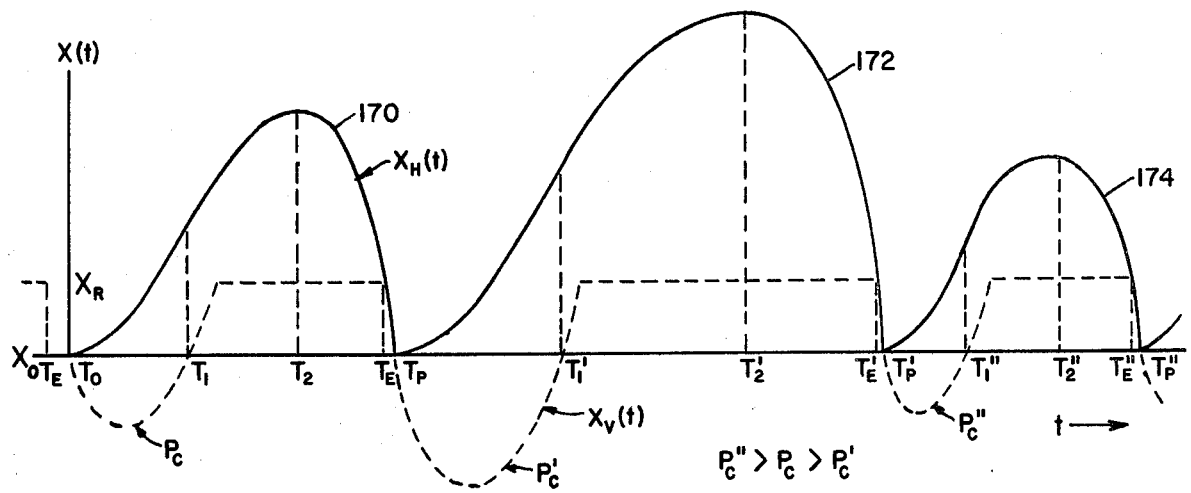
FIG. 11 is a curve illustrating the time displacement history of the valve and the hammer in the tools of the type illustrated in FIGS. 3 to 5, 7, 8, 9, 14 and 16.

FIG. 11 illustrates the cycles 170, 172 and 174 of oscillation of the hammer. The cycle 172 shows the hammer oscillating at a lower frequency but with higher blow energy than is the case with the cycle 170. The cycle 174 illustrates the case of higher frequency and lower blow energy.

The solid line curve in FIG. 11 illustrates the displacement of the hammer $X_H(t)$ with respect to time, while the dash line curve illustrates the displacement of the valve with respect to time, $X_V(t)$. During the first cycle 170 the pressure in the valve cavity 124 is $P_C$. $X_0$ indicates the position of the hammer and valve at the switching point where the pressure in the lower cavity 110 is switched from supply to return and vice versa. $X_R$ represents the rest position of the valve. At $T_E$ the hammer has engaged the valve and the valve is driven downwardly. When hammer and valve reach position $X_0$ the hammer is driven, in response to the differential force on the hammer, upwardly in the return stroke direction. Due to the control pressure $P_C$, the valve 120 decelerates and returns to the switching position at time $T_1$. The net force on the hammer then switches to the forward stroke direction. However, since the hammer has acquired an initial velocity in the return stroke direction between times $T_0$ and $T_1$, it continues to decelerate until it reaches zero velocity at the top of the return stroke which occurs at time $T_2$. The hammer then travels downwardly at increasing velocity in the forward stroke direction until it reaches the impact position at time $T_P$. At time $T_E$, just before $T_P$, the hammer again engages the valve 120 and drives it downwardly.

Consider that for the next cycle of oscillation 172 the pressure $P_C$ has been reduced to a lower pressure $P_C'$. The force developed on the valve to decelerate it and then return it to the switching position is now reduced and the valve requires a longer period of time to return to the switching position at $X_0$. In other words the period of time from $T_P$ to $T_1'$ is longer than the period of time from $T_0$ to $T_1$. During this longer period of time the hammer has the opportunity to execute a longer stroke in the return direction and thus develop increased velocity. It then requires a longer time than the period from $T_1$ to $T_2$ for the hammer to be decelerated to zero velocity and reach the top of the return stroke. The total return stroke is executed during the period $T_P$ to $T_2'$. The following forward stroke back to impact position at time $T_P'$ is thus significantly longer than the stroke executed during the first cycle 170. The hammer then is enabled to reach a higher velocity and deliver a higher blow energy to the shank 36 and thence to the load. The overall time period from $T_P$ to $T_P'$ is correspondingly longer than the time period in $T_0$ to $T_P$, thus illustrating that the blow frequency has been reduced. The product of blow frequency and blow energy can be substantially constant. Thus the power level (average power) which continues to be delivered by the impact tool is maintained.

During the next cycle 174 the pressure in the lower valve cavity 124 is increased to $P_C''$. This results in an increase in the force on the valve element 120, a reduction in the time period from $T_P'$, when the pressure in the lower cavity 110 is switched from return to supply, to $T_1''$ when the pressure in the lower cavity is switched back from supply to return. Accordingly, the return stroke and the following forward stroke during the cycle 174 are reduced in amplitude, while the blow frequency is increased. The impact blow is delivered at $T_P''$ when the hammer reaches the impact position after having been decelerated to zero velocity at time $T_2''$.

It will be noted in FIG. 5 that the lower end of the valve element 120 may be received in a cavity 176 formed by a step at the top of the lower bearing member 26 and the wall of the bore in the lower liner part 104. This step in the bearing memeber 26 may be tapered so as to provide a dashpot action. This dashpot action may be controlled in order to further control the displacement of the valve element 120 and the corresponding displacement of the hammer 106 along its return stroke. Means for utilizing and controlling this dashpot action so as to provide a further control over the blow frequency and blow energy may be included in the impact tool. Such means enables the blow frequency to be further reduced and the blow energy to be further increased. Impact tools having such further control means which embody the invention are illustrated in FIGS. 14 through 16 which are described hereinafter.

Figure 7:
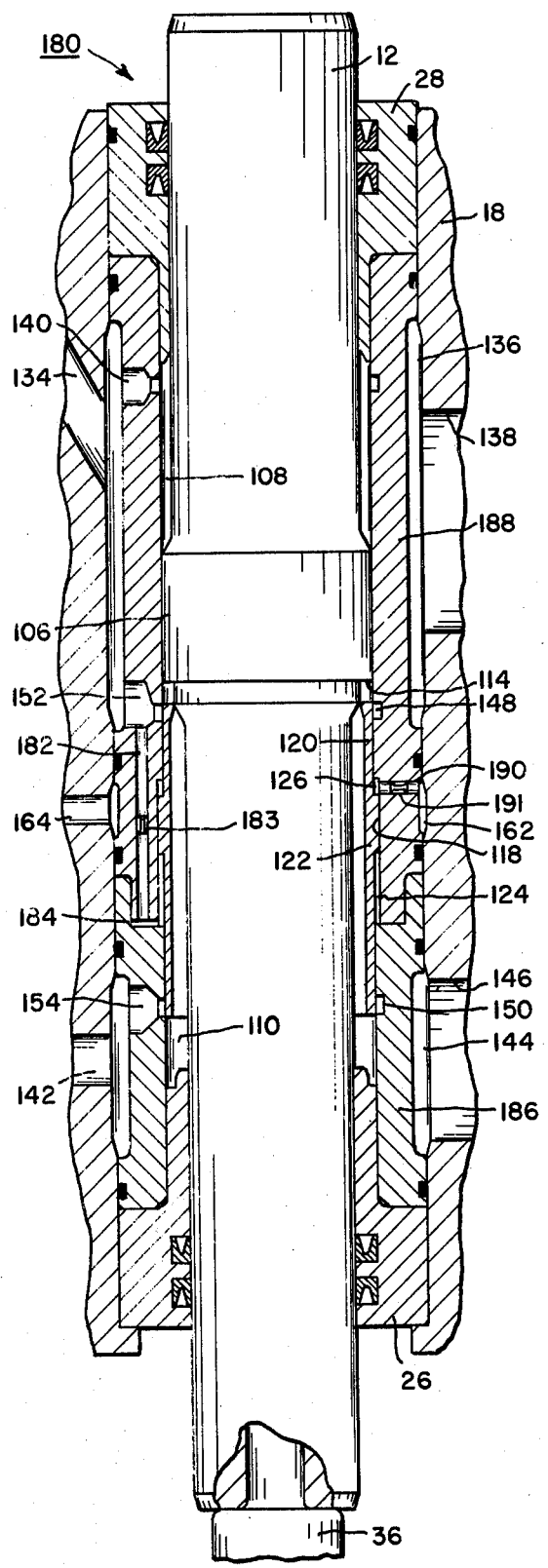
FIG. 7 is a fragmentary sectional view of an impact tool similar to the tool shown in FIGS. 3 to 6 but in accordance with another embodiment of the invention.

FIG. 7 illustrates an impact tool 180 in accordance with another embodiment of the invention. This tool is similar to the tool shown in FIGS. 3 to 5 and corresponding parts are identified with like reference numerals. In the tool shown in FIG. 7 there is provided a channel 182, with dynamic damper 183, between the passage connected to the supply gallery 136 which communicates with the lower valve cavity 124 through a gap 184 between the lower and upper liner parts 186 and 188. The lower liner part 186 is longer than the liner part 104 in the tool of FIGS. 3 to 5, and the upper liner part 188 is longer than the corresponding liner part 102 of the tool shown in FIGS. 3 to 5. The control pressure is applied to the upper cavity 126 by way of a passage 190, with dynamic damper 191, between the control pressure gallery 162 and the cavity 126. The supply pressure is communicated to the lower cavity 124. The control pressure is lower than the supply pressure and is between the supply and return pressure. This enables the use of a simplified hydraulic circuit which requires only one pump. Such a hydraulic circuit is shown in FIG. 12. The operation of the tool in FIG. 7 is, otherwise, the same as the operation of the tool shown in FIG. 5.

Figure 8:
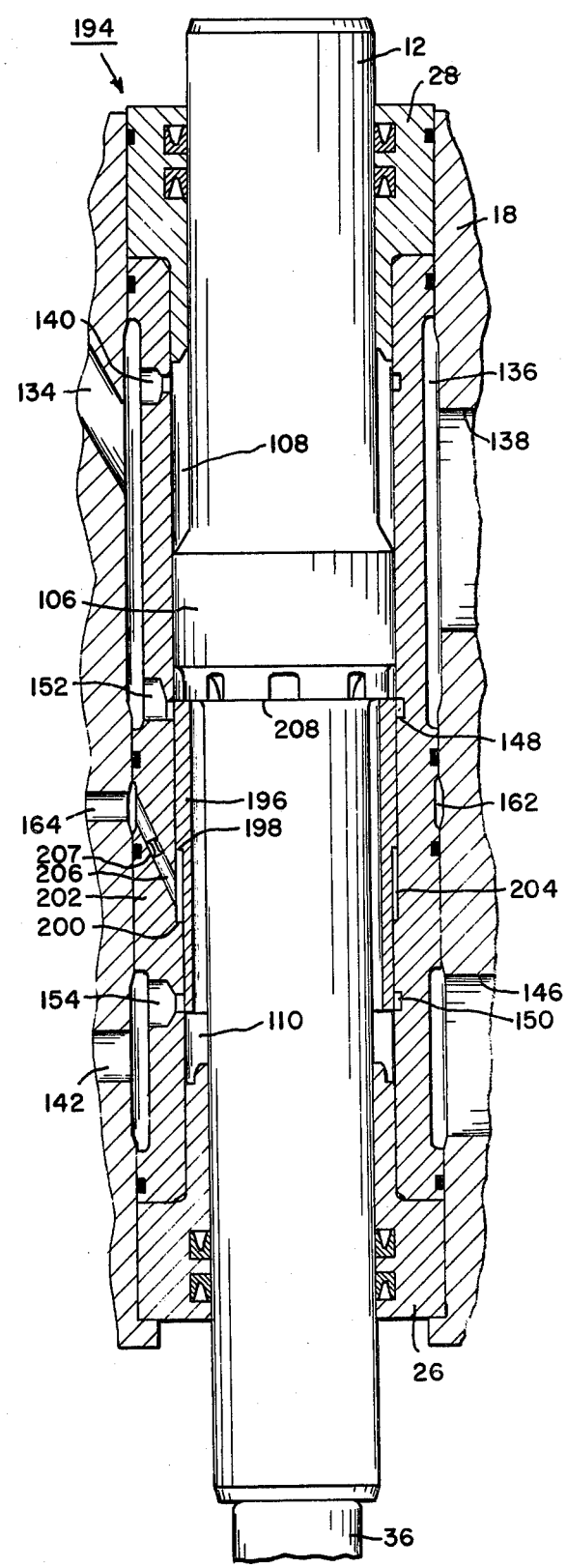
FIG. 8 is a fragmentary sectional view of a tool similar to the tool shown in FIGS. 3 to 6 but in accordance with a still further embodiment of the invention.

FIG. 8 illustrates another tool 194 in accordance with another embodiment of the invention. A valve element 196 is provided with a single step 198 which faces in the forward stroke direction and forms, with a step 200 in a single piece liner 202, a single valve cavity 204. The control pressure is applied to this valve cavity from the control pressure passage 164 by way of a channel 206 which includes dynamic damper 207. This control pressure must be higher than supply pressure in order to assure that the valve element 196 will be continuously urged upwardly in the return stroke direction. The upper end of the valve 196 is engaged by the hammer 12 through a slotted extension 208 from the lower side of the central section 106 of the hammer. The slots in the extension 208 permit the free circulation of fluid around the upper end of the valve element 196. The net force on the valve element 196 is determined by the area of the step 198 and the control pressure amplitude. The impact tool 194 operates similarly to the tool described in connection with FIG. 7 but offers certain simplicity in design of the liner 202 and the valve element 196.

A hydraulic circuit for operating the impact tool shown in FIGS. 2, 3 to 5 and in FIGS. 7, 9, 14 and 16 with control pressures $P_C$ less than the supply pressure $P_S$ (viz., between return pressure $P_R$ and supply pressure $P_S$) is shown in FIG. 12. The hydraulic fluid pressures are developed in a pump 210 which may be driven by a diesel motor or other motor which is part of the hydraulic power supply of the tool. The supply side of the pump is connected by way of hoses and couplings to the upper cavities $U_C$, lower cavities $L_C$ and valve cavities $V_C$ as labeled in FIG. 12. The control pressure $P_C$ is developed by varying the supply pressure through the use of a pressure regulating valve 212. An accumulator 214 may be connected to the control pressure line. This accumulator may for example be disposed in the housing and connected to the control pressure gallery 162. The accumulator 214 may suitably be a small accumulator inasmuch as the valve cavities are relatively small and the volume flow variations therein are correspondingly small. Suitable accumulator action for maintaining the control pressure constant may in certain tool designs be obtained due to the compliance in the hoses connecting the valve 212 to the control pressure of passages 164.

The hydraulic circuit shown in FIG. 13 provides control pressures higher than the supply pressure. A pump 218 similar to the pump 210 provides the supply pressure $P_S$ and receives the control pressure $P_R$. The supply pressure is boosted by a booster pump 220 connected to the supply pressure side of the pump 218. The boosted pressure is varied by a regulator valve 222 to provide the control pressure. Variations in the control pressure as selected by the regulator valve 222 are minimized by an accumulator 224. The control pressure and the supply and return pressures are connected to the various cavities as labeled on the drawings.

Referring now to FIG. 9 there is shown an impact tool 226 in accordance with still another embodiment of the invention. The tool 226 is similar to a large extent to the tool shown in FIGS. 1 and 2, and like parts are indicated by like referenced numerals.

The hammer 12 has a circular recess 228 which receives a split ring 230. Another ring 232 which is press fit over the split ring 230 locks the split ring in place in the recess 228. A lip 234 which extends radially outward on the split ring 230 defines a step which engages a shoulder 236 on the upper end of a valve element 240. An outwardly tapered step 242 on the upper end of the valve 240 which extends upwardly from the shoulder 236 forms a tapered pocket with the lip 234 of the split ring 230. This tapered pocket provides means for damping engagement of the hammer with the valve 240. The shoulder 236 is located such that, at the impact position, the valve 240 will switch pressure in the upper cavity 52 from supply to return pressure. The valve cavity 84 is maintained at return pressure by connecting it to the return gallery 66 via a channel 241. The control pressure is connected to the lower valve cavity 86 by way of the control pressure passage 98 and another passage 244. Restrictors 243 and 245 serve the same purpose as the restrictors 157 and 161 (FIG. 3). The pressurized fluid in the valve cavities therefore develops forces on the valve 240 to continuously urge it upwardly in the return stroke direction.

The operation of the impact tool 226 is the same as the operation of the tool 100 shown in FIGS. 3 to 5, and described in connection with FIG. 11; thus, illustrating that either the upper cavity or the lower cavity of the impact tool may be used as the active cavity in which pressure is switched between supply and return in an impact tool wherein hammer stroke length, blow frequency and blow energy may be varied.

FIG. 14 shows an impact tool 250 in accordance with another embodiment of the invention. The tool 250 is of a design similar in many respects to the tool 180 which is described in connection with FIG. 7. The tool 250 has a valve element 252 which is longer in the axial direction and is relieved at 254 (see FIG. 15). A plurality of openings 256 are provided through the valve in the relieved section 254 so as to enable communication with the lower cavity 110 through the valve 252 by way of the openings 256.

The lower bearing member 26 is formed with a step which forms a cavity 258 between the step portion of the bearing member 26 and the wall of the bore in the liner sleeve 186. The lower end of the valve element 252 is received in the cavity 258 when the valve element is engaged by the hammer and driven downwardly. A column of fluid is trapped in the cavity 258. Fluid is allowed to escape from the cavity 258 through conduits 260, 262, 264, 266 and 268. The conduit 268 communicates with a peripheral groove 270 in the bore of the lower liner 186. The openings 256 in the valve element 252 are positioned such that flow of fluid from the cavity 258 through the conduits 260, 262, 264, 266 and 268 will pass through the groove 270 and through the openings 256 when the lower end of the valve element 252 is received in the cavity 258. The conduit 264 has means therein for controlling the flow of the fluid. This means is indicated schematically as a valve 272 and may be provided by any controllable orifice. The valve 272 may be a servo valve such that the flow may be remotely controlled. A suitable servo valve may either be electrically or hydraulicaly controlled. The cavity 258 operates as a variable dashpot so as to provide variable damping forces on the valve. The amplitude of such forces depends upon the size of the orifice or hydraulic resistor presented by the valve 272 to the flow of fluid through the passages 260 to 268. In other words, the length of the downward stroke of the valve element 252 into the cavity 258 may be varied by means of the valve 272. Thus, if the valve 272 is closed the valve element 252 will move a minimal distance downwardly into the cavity 258 until pressure built up therein stops its movement. The more the valve 272 is opened, the longer the stroke of the valve in the downward direction. The arrangement for controlling the downward stroke of the valve thus provides an additional degree of control over and above that provided by the fluid pressure actuation of the valve 252 by means of the controllable fluid pressure in the valve cavity 124 and 126.

In order to allow the valve 252 to travel upwardly without being restricted by fluid in the cavity 258, a check valve 273 may be provided through which fluid may flow when the valve 252 is driven upwardly.

FIG. 16 shows an impact tool 280 similar to the tool 250 shown in FIG. 14. The tool 280 has a valve 282 which need not be lengthened nor provided with openings like the valve 252 used in the tool 250. The path for return of the hydraulic fluid to the lower cavity 110 is provided by a passage 284 which communicates with a cavity 286 formed by a relieved section 288 of the lower bearing member 26 and the outer periphery of the lower end of the hammer 12. Otherwise the operation of the tool 280 is the same as that of the tool 250 and like parts are indicated with like reference numerals. In the case of both the tools 250 and 280 it is preferable to return the flow from the cavity 258 to the lower cavity 110 since this avoids leakage of fluid from the tool which would require additional flow from the hydraulic power supply.

From the foregoing description it will be apparent that there has been provided improved impact tools which have means for varying the blow frequency as well as blow energy. The tools described herein are preferably operated by pressurized hydraulic fluid, such as oil, rather than gas such as compressed air. Features of the invention will however be adaptable to tools which are operated by compessed gasses (viz., pneumatically operated impact tools). Other variations and modifications of the disclosed impact tools, within the scope of the invention, will undoubtedly suggest themselves to those skilled in the art. Accordingly, the foregoing description should be taken merely as illustrative and not in any limiting sense.

What is claimed is:

1. An impact tool for producing percussive forces which are repetitive at selected frequencies, said tool comprising:
   a hammer,
   a valve element,
   said hammer and valve element being movably disposed together in a chamber and having freedom to travel independently,
   means for conducting with said valve element pressurized fluid into and out of said chamber for developing forces upon said hammer to effect oscillatory movements of said hammer in opposite directions,
   said conducting means including a pair of ports communicating with said chamber, said valve element being disposed in switching relationship with said ports to open one of said ports and close the other of said ports when said valve element moves in one of said opposite directions past a first switching position and to close the one of said ports and operate said other port when said valve element moves in the other of said opposite directions past a second switching position,
   means for mounting said valve element in said chamber for movement in said opposite directions beyond said switching positions,
   said hammer being engageable with said valve element to effect movement thereof in said one of said opposite directions to carry said valve element beyond said first switching position such that said pressurized fluid is conducted with respect to said chamber to develop forces upon said hammer in the other of said opposite directions which limit the movement of said hammer in said one direction without said valve element physically limiting the freedom of movement of said hammer in said one direction, and
   pressurized fluid applying means for developing and controlling the net pressurized fluid forces upon said valve element only in the other of said opposite directions to effect movement of said valve element in the other of said opposite directions past said second switching position such that said pressurized fluid is conducted with respect to said chamber to develop forces upon said hammer in said one direction a predetermined time after said hammer engages said valve element.

2. The invention as set forth in claim 1 wherein said one of said opposite directions is the direction of the forward stroke of said hammer to an impact position and said other of said opposite directions is the direction of the return stroke of said hammer away from said impact position whereby the length of said return stroke and its following forward stroke is a function of said predetermined time.

3. The invention as set forth in claim 1 wherein said pair of ports of said pressurized third conducting means are supply and return ports in communication with said chamber and in porting relationship with said valve element such that one of said ports is opened while the other is closed when said hammer engages and moves said valve element and the other of said ports is opened while said one port is closed after said predetermined time.

4. The invention as set forth in claim 3 wherein predetermined time is a function of the force due to said pressurized fluid applying means upon said valve element.

5. The invention as set forth in claim 4 including means in said pressurized fluid applying means for varying the pressure applied to said valve element and the resulting forces thereupon.

6. The invention as set forth in claim 2 wherein said hammer is disposed to engage said valve when it reaches said impact position, and said pair of ports of said pressurized fluid conducting means are supply and return ports communicating with said chamber, said valve element being disposed in porting relationship with said supply and return ports and also being movable in the direction of said forward and return strokes to alternately open and close said ports, said pressurized fluid forces upon said hammer being in said forward stroke direction when said one port is open and said other port is closed and in said return stroke direction when said one port is closed and said other port is open, means maintaining said valve element at the end of its movement in said return stroke direction in position where said other port is closed and the said one port is open such that upon engagement of said hammer with said valve, said one port closes and said other port opens to develop said forces upon said hammer in said return stroke direction immediately after said hammer reaches said impact position.

7. The invention as set forth in claim 6 wherein said one port is said return port and said other port is said supply port.

8. The invention as set forth in claim 5 wherein said pressurized fluid applying means comprises means providing a source of pressurized control fluid having a pressure different from the pressure communicated to said supply and return ports, and means for communicating said pressurized control fluid to said valve element.

9. The invention as set forth in claim 1 wherein said valve element has a portion which is movably disposed in a second chamber, and said pressurized fluid applying means includes means for continuously communicating pressurized fluid with said second chamber.

10. The invention as set forth in claim 9 wherein said valve element portion in said second chamber presents an area in a plane perpendicular to the direction of movement thereof to said pressurized fluid therein.

11. The invention as set forth in claim 10 wherein said area is defined by a step in said valve element and said means for communicating pressurized fluid with said second chamber provides said pressurized fluid at a pressure higher than the highest pressure of said fluid conducted to the chamber in which said hammer and valve element are disposed.

12. The invention as set forth in claim 10 wherein said valve element portion is a step dividing said chamber into a first section and a second section, said pressurized fluid communicating means communicating pressurized fluid having higher and lower pressure to said first and second sections respectively.

13. The invention as set forth in claim 12 including means providing a source of control pressure, said pressurized fluid communicating means communicating said control pressure source to one of said sections.

14. The invention as set forth in claim 1 further comprising means defined by said hammer and valve element providing for damping the motion of said valve as said hammer engages said valve element.

15. The invention as set forth in claim 14 wherein said damping means comprises a pocket defined by said hammer and said mass when they come into engaging relationship, said pocket containing the fluid in said chamber.

16. The invention as set forth in claim 15 wherein a step and a side on one of said valve element and hammer and an end on the other of said valve element and hammer define said pocket, the edge of said end defining an edge disposed adjacent said side, said side being tapered away from said step and said edge and said tapered side defining an orifice for controlling the flow of fluid from said pocket as said end and step move into engaging relationship.

17. The invention as set forth in claim 16 wherein said hammer is cylindrical and said valve is a tube around said hammer, said edge being defined by a conical section on the inner periphery of an end of said tube.

18. The invention as set forth in claim 2 wherein said pressurized fluid conducting means includes supply and return ports communicating with the chamber, said hammer and said valve element defining a pocket for fluid in said chamber when said hammer moves into engagement with said valve and moves said valve through the fluid trapped in said pocket, said supply port being disposed to communicate with said pocket when said hammer moves along its forward stroke to said impact position such that fluid at supply pressure enters said pocket to develop forces on said valve element in the direction of said forward stroke to enable rapid separation of said valve element and said hammer from each other.

19. The invention as set forth in claim 18 further comprising means in said chamber for defining a cavity for receiving the end of said valve element opposite to the end engageable with said hammer upon movement of said valve element when engaged by said hammer, said opposite end of said valve element entrapping fluid from said chamber therein and controlling the displacement of said valve element in said one direction.

20. The invention as set forth in claim 19 including means providing for the flow of said entrapped fluid from said cavity.

21. The invention as set forth in claim 20 wherein said flow providing means comprises means communicating said cavity and said chamber.

22. The invention as set forth in claim 21 including valve means in said communicating means for controlling the flow of said entrapped fluid between said cavity and said chamber.

23. The invention as set forth in claim 1 wherein said hammer has a section which divides said chamber into first and second cavities on opposite sides of said section, said valve element and a portion of said hammer which is engageable therewith being disposed in said first cavity, and means for introducing pressurized fluid into said second cavity for continuously urging said hammer to move in said one direction.

24. The invention as set forth in claim 23 wherein said one direction is the direction of the return stroke of said hammer and said other direction is the direction of the forward stroke of said hammer to an impact position, said second cavity being disposed on the side of said hammer section facing toward said impact position, and said first cavity being disposed on the side of said section facing away from said impact position, said pressurized fluid conducting means including a supply port and a return port spaced from each other in the direction of movement of said hammer with said supply port being closer to the away-facing side of said hammer section than said return port whereby said valve element is engaged by said hammer to open said supply port and close said return port when said hammer moves in the return stroke direction into engagement with said valve element.

25. The invention as set forth in claim 24 wherein said impact tool includes a housing having an axially extending opening defining said chamber, said hammer being disposed for said oscillatory movement in said opening, said pressurized fluid applying means being provided by a third cavity defined by the wall of said housing which defines said opening and said valve element, said valve element having a portion extending into said opening and dividing said opening into first and second parts on opposite sides of said portion, said first part being closer to said impact position than said second part, and means for conducting pressurized fluid to said first and second parts at higher and lower pressure respectively.

26. The invention as set forth in claim 25 wherein said conducting means to said second part is a channel connected to return pressure, and said conducting means to said second part is a channel connected to a control pressure which can be varied.

27. The invention as set forth in claim 23 wherein said one direction is the direction of the forward stroke of said hammer to an impact position and said other direction is the direction of the return stroke of said hammer, said first cavity being disposed on the side of said hammer section facing toward said impact position and said second cavity being disposed on the side of said hammer section facing away from said impact position, said pressurized fluid conducting means including a supply port and a return port with said supply port being closer to the toward-facing side of said hammer section than said return port whereby said valve element opens said supply port and closes said return port when said hammer moves in the forward stroke direction into engagement with said valve element.

28. The invention as set forth in claim 27 wherein said impact tool includes a housing having an axially extending opening defining said chamber, said hammer being disposed for said oscillatory movement in said opening, said pressurized fluid applying means being provided by a third cavity defined by the wall of said housing which defines said opening and said valve element, said valve element having a portion extending into said opening and presenting an area facing in said forward stroke direction, and means for conducting to said third cavity pressurized fluid at pressure higher than said pressure conducted to said supply port.

29. The invention as set forth in claim 27 wherein said impact tool includes a housing having an axially extending opening defining said chamber, said hammer being disposed for said oscillatory movement in said chamber, said pressurized fluid applying means being provided by (a) a third cavity defined by the wall of said housing which defines said opening and said valve element, said valve element having a portion extending into said opening, and dividing said third cavity into first and second parts, said first part being defined by an area of said portion facing in said forward stroke direction and said second part being defined by an area of said portion facing in said return stroke direction, and (b) means for conducting pressurized fluid at different pressures to said first and second parts to develop a net force on said valve element in said return stroke direction.

30. The invention as set forth in claim 29 wherein said conducting means includes a first channel in said housing communicating said second part to return pressure, and a second channel in said housing communicating said first part to control pressure higher than said return pressure.

31. The invention as set forth in claim 29 wherein said conducting means includes a first channel in said housing communicating said first part with control pressure lower than the supply pressure and a second channel in said housing communicating said second part with supply pressure.

32. The invention as set forth in claim 1 wherein said hammer has a section which divides said chamber into first and second cavities, first and second sides of said section being opposite to each other, said first section side facing in the one of said opposite directions which is the direction of the return stroke of said hammer and said second section side facing in the other of said opposite directions which is the direction of the forward stroke of said hammer, said valve element and a portion of said hammer which is engageable therewith being disposed in said first cavity, said portion being disposed to effect movement of said valve element in the forward stroke direction, said pressurized fluid applying means being operative to effect movement of said valve element in said return stroke direction, and means for introducing pressurized fluid into said second cavity for continuously urging said hammer to move in said return stroke direction.

33. The invention as set forth in claim 23 wherein said impact tool has a housing having an axially extending opening in which said hammer is disposed for said oscillatory movement in the axial direction, said first cavity being defined by the walls of said housing and said hammer, said valve element being slidably movable adjacent the wall of said housing which extends in the axial direction, means in said housing defining with a portion of said axially extending wall a third cavity for receiving the end of said valve element opposite to the end thereof which is engaged by said hammer portion, and channel means in said housing communicating said first cavity and said third cavity through which fluid entrapped in said third cavity can flow.

34. The invention as set forth in claim 33 wherein said valve element having openings extending therethrough between the surface thereof facing said axial housing wall and the surface thereof facing said first cavity, said channel means including a port in said axial wall communicating with said valve element opening.

35. The invention as set forth in claim 33 wherein said means which defines said third cavity also defines with said hammer a fourth cavity disposed between said third cavity and said hammer, said fourth cavity being in communication with said first cavity, and said channel means communicating said third and fourth cavities with each other.

36. The invention as set forth in claim 33 including a flow regulator valve in said channel means.

37. The invention as set forth in claim 36 including a check valve connected across said regulator valve.

38. An impact tool for repetitively producing percussive forces, said tool comprising
  a. a housing having an opening extending in a direction axially thereof,
  b. a hammer mounted in said opening for oscillatory movement in said axial direction in forward and return strokes toward and away from an impact position,
  c. said hammer having a section dividing said opening into first and second cavities, and presenting first and second areas therein in the planes perpendicular to said axial direction,
  d. means for introducing pressurized fluid into said cavities to alternately apply net pressurized fluid forces on said areas directed toward and away from said impact position to cause said hammer to execute said forward and return strokes, said last named means including a valve mechanism in said first cavity comprising (1) supply and return ports for said pressurized fluid in communication with said first cavity and spaced from each other in said axial direction, (2) a valve element disposed in porting relationship with said ports and freely movable in said axial direction over distances beyond said ports to open one of said ports and close the other of said ports when said valve element moves in the direction of one of said strokes past a first switching position and to close the one of said ports and open said other port when the valve element moves in the direction of the other of said strokes past a second switching position, (3) said housing and said valve element defining a chamber, said chamber having an axial length greater than the distance which said valve element traverses in moving beyond said ports past said switching positions, (4) said valve element having a portion extending into said chamber and presenting an area therein in a plane perpendicular to said axial direction, (5) said hammer having a portion engageable with said valve element when it moves in one of said strokes for moving said element therewith over a distance smaller than the distance over which said valve element is freely movable beyond said switching positions to open one of said ports and close the other of said ports without limiting the movement of said hammer in the direction of said one of said strokes, (6) means for introducing fluid having controlled pressure into said chamber for applying net fluid pressure forces on said valve element area only in a direction toward said hammer portion to open the other of said ports and close said one port, a predetermined time after said hammer has moved along the other of said strokes.

39. An impact tool for producing percussive forces for application to a load which comprises
  a. a housing having an opening extending axially thereof,
  b. a hammer mounted in said opening for free oscillatory movement in opposite directions axially of said opening toward and away from an impact position,
  c. said hammer and said housing defining in said opening a cavity,
  d. a valve mechanism modulating the flow of pressurized hydraulic fluid into and out of said cavity for producing pressure variations therein for sustaining the oscillations of said hammer, e. said valve mechanism including a valve element mounted in said cavity for free movement in opposite directions axially of said cavity over a distance,
f. pressurized fluid supply and return means in said housing including supply and return ports in said cavity spaced from each other in a direction axially of said cavity less than said free movement distance and disposed in porting relationship with said valve element,
g. said hammer having a radially extending portion which engages said valve element when said hammer moves in one of said opposite directions and for moving said valve element toward the position where said valve element opens one of said ports and closes the other of said ports without said valve element limiting the stroke of said hammer in said one of said opposite directions,
h. said valve element and the wall of said housing which defines said cavity forming a chamber therebetween extending axially of said housing the axial length of said chamber defining said free movement distance,
i. said valve element having a portion extending into said chamber and presenting an area in a plane perpendicular to the axis of said housing,
j. means for introducing pressurized hydraulic fluid into said chamber for applying net pressurized hydraulic fluid forces upon said valve element to move said valve element only in the other of said opposite directions, and
k. means for varying the frequency of oscillation of said hammer by controlling the pressure of the fluid introduced into said chamber.

* * * * *